(12) United States Patent
Sako

(10) Patent No.: US 8,111,593 B2
(45) Date of Patent: Feb. 7, 2012

(54) OBJECTIVE LENS DRIVE AND OPTICAL PICKUP APPARATUS

(75) Inventor: Shinichi Sako, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 279 days.

(21) Appl. No.: 12/258,032

(22) Filed: Oct. 24, 2008

(65) Prior Publication Data

US 2009/0108683 A1 Apr. 30, 2009

(30) Foreign Application Priority Data

Oct. 31, 2007 (JP) ................................. 2007-284334

(51) Int. Cl.
*G11B 7/00* (2006.01)

(52) U.S. Cl. .................................... 369/44.15; 720/683

(58) Field of Classification Search ............... 369/44.11, 369/44.14–44.22; 720/681–687
See application file for complete search history.

(56) References Cited

U.S. PATENT DOCUMENTS

| | | | | |
|---|---|---|---|---|
| 5,467,336 A | * | 11/1995 | Ando et al. ................. | 369/44.17 |
| 6,278,669 B1 | * | 8/2001 | Anzai et al. ................. | 369/44.14 |
| 6,343,053 B1 | * | 1/2002 | Akanuma et al. .......... | 369/44.14 |
| 2003/0161252 A1 | | 8/2003 | Sugawara | |
| 2004/0004774 A1 | | 1/2004 | Fujita | |
| 2006/0168607 A1 | * | 7/2006 | Ohkuma et al. ............. | 720/683 |
| 2006/0218569 A1 | * | 9/2006 | Jang et al. .................... | 720/683 |

FOREIGN PATENT DOCUMENTS

| | | |
|---|---|---|
| CN | 1441416 | 9/2003 |
| JP | 7-65397 | 3/1995 |
| JP | 8-180441 | 7/1996 |
| JP | 11-66587 | 3/1999 |
| JP | 11-312327 | 11/1999 |
| JP | 2003-115124 | 4/2003 |
| JP | 2003-173556 | 6/2003 |
| JP | 2004139642 A * | 5/2004 |
| JP | 2007-115346 | 5/2007 |

OTHER PUBLICATIONS

Machine-Assisted Translation of JP 2004139642 A.*

* cited by examiner

*Primary Examiner* — Nathan Danielsen
(74) *Attorney, Agent, or Firm* — Morrison & Foerster LLP

(57) ABSTRACT

An objective lens drive and an optical pickup apparatus are provided which can be reduced in size. Two tilt coils and two tracking coils are disposed so that among planes defined by the respective coils, a plane perpendicular to a winding direction thereof is parallel to a reference plane defined on a lens holder at a predetermined reference distance or less, and are disposed at such positions as to be symmetrical to each other about a center of gravity of the lens holder. A focus coil is disposed so that among planes defined by the focus coil, a plane perpendicular to a recording surface of an optical disk is parallel to the reference plane at a predetermined reference distance or less relative to the two tilt coils and the two tracking coils.

11 Claims, 6 Drawing Sheets

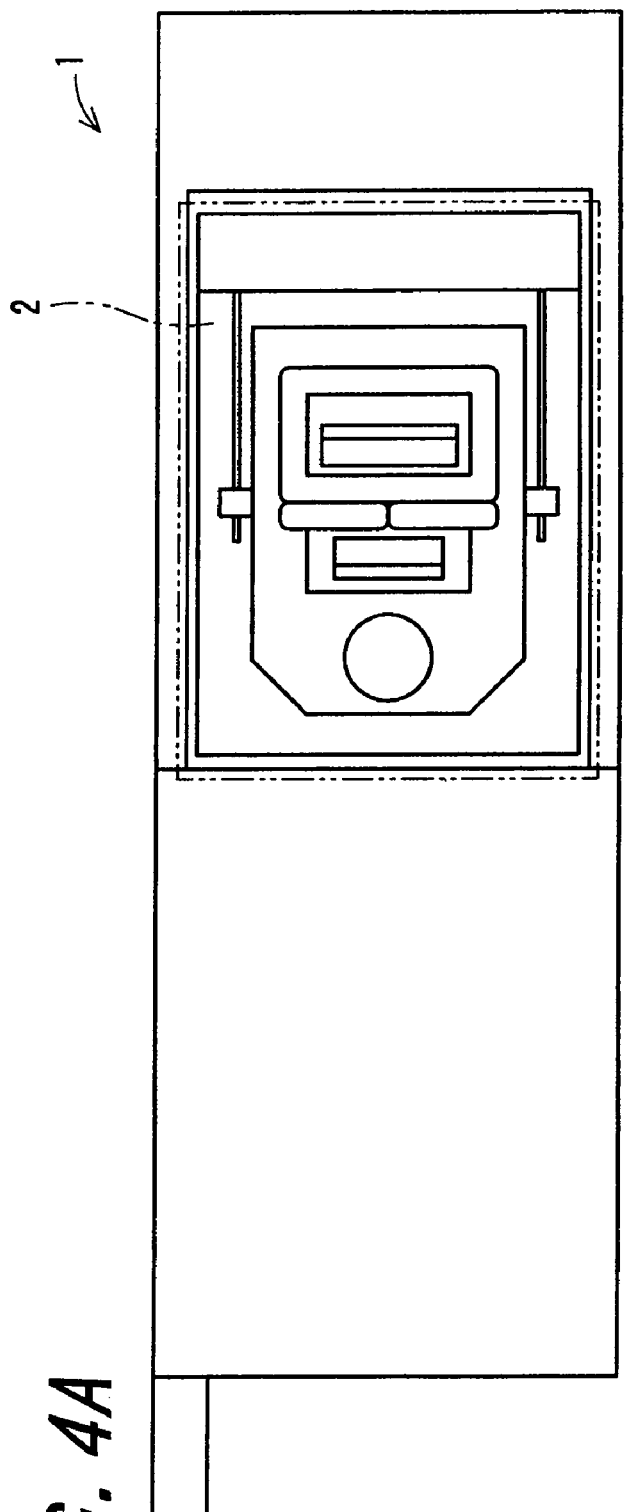

OBJECTIVE LENS DRIVE AND OPTICAL PICKUP APPARATUS

CROSS-REFERENCE TO RELATED APPLICATION

This application claims priority to Japanese Patent Application No. 2007-284334, which was filed on Oct. 31, 2007, the contents of which are incorporated herein by reference in its entirety.

BACKGROUND OF THE INVENTION

1. Field of the Invention

The present invention relates to a drive system for driving an objective lens and an optical pickup apparatus.

2. Description of the Related Art

FIGS. 5A to 5C are views each showing an actuator 40 according to a first related art. FIG. 5A is a top view, FIG. 5B a side view, and FIG. 5C a sectional view taken along cross-section line D-D shown in FIG. 5A. The actuator 40 is adapted to an optical pickup apparatus where an optical disk is used as a recording medium. In order to record or reproduce information on the optical disk 11, the actuator 40 includes a focus direction drive unit which controls a light beam 12 collected by an objective lens 401 to focus at an optimum position on the optical disk 11, a tracking direction drive unit which follows a specific track, and a tilt direction drive unit which optionally tilts the objective lens 401 in accordance with a tilt of the optical disk 11.

In the focus direction drive section a lens holder 402 holding the objective lens 401 is driven in an optical axis direction by means of a drive mechanism with a focus coil 408 and a magnet 405 so that a beam spot is focused on the optical disk 11. In the tracking direction drive unit, the lens holder 402 holding the objective lens 401 is driven in a radial direction of an optical disk 11 orthogonal to the optical axis direction by means of a drive mechanism with a tracking coil 407 and a magnet 404 so that the beam spot follows the specific track on the optical disk 11.

In the tilt direction drive unit, the lens holder 402 holding the objective lens 401 is tilted in accordance with the tilt of the optical disk 11 by means of a drive mechanism with a tilt coil 406 and a magnet 410. The lens holder 402 holds not only the objective lens 401 but also the focus coil 408, the tracking coil 407, and the tilt coil 406 integrally.

A support member 413 fixed to a base plate 403 supports the lens holder 402 with the aid of six elastic support members 409, for example, which are arranged in parallel to each other, like vertically-arranged three by laterally-arranged two. The elastic support members 409 are deformed to be curved by drive force of the focus coil 408, the tracking coil 407, the tilt coil 406, the magnet 404, the magnet 405, and the magnet 410, thereby allowing for movement in the focus direction, tracking direction, and tilt direction.

In an objective lens drive according to a second related art, tilt coils are disposed on opposite sides in a tracking direction, of a displaceable lens holder, and at a position outside each of the tilt coils is disposed a tilt magnet which is vertically divided into two magnet parts with different polarities (refer to Japanese Unexamined Patent Publication JP-A 2003-115124).

In an optical head device according to a third related art, it is not necessary to provide the magnet for driving only a tilt coil, but tracking coils are disposed on opposite sides in a tracking direction, of a focus coil displaceable. Furthermore, two tilt coils are laterally arranged in the tracking direction under the focus coil, and the moment generated by the respective tilt coils allows for movement driven in a tilt direction (refer to Japanese Unexamined Patent Publication JP-A 2003-173556).

In an objective lens drive according to a fourth related art, two focus coils are disposed laterally with a distance therebetween, and so are two magnets (refer to Japanese Unexamined Patent Publication JP-A 11-312327).

In the first and second related art, the magnet only used for the tilt coil is provided, therefore entailing a problem that the actuator is increased in size to secure a space required for the magnet, which causes an increase in cost, even if the magnet is not divided into the magnet parts with different polarities. Furthermore, in the second related art, the drive force may be unstable depending on a displaceable position in the tracking direction.

In the third related art, the tracking coils are disposed on the opposite sides in the tracking direction, of the focus coil displaceable, and in order to secure displacement in the tracking direction, a problem arises that a magnet is inevitably large in width. Furthermore, in such a configuration that the two tilt coils are laterally arranged in the tracking direction under the focus coil and that the moment generated by the respective tilt coils allows for movement driven in the tilt direction, it is hard to generate the drive force with small electricity due to the arrangement remote from a position of center of gravity of the lens holder.

In the fourth related art having two laterally-separated focus coils and two laterally-separated magnets, the displacement in the tracking direction needs to be secured while the two magnets are distanced as far away as possible from each other, in order to promote the generation of the drive force in the tilt direction. Furthermore, in order to use the divided magnet to obtain the drive force in the focus direction, the magnet needs to have its width secured and therefore causes a problem of size increase in the tracking direction of the apparatus.

SUMMARY OF THE INVENTION

An object of the invention is to provide an objective lens drive and an optical pickup apparatus which can be reduced in size.

The invention provides an objective lens drive comprising:
a light-collecting unit for collecting a light beam;
a holding unit having a reference plane defined thereon, for holding the light-collecting unit;
a first coil held by the holding unit, for moving the holding unit so that the light beam collected by the light-collecting unit focus on a recording medium for recording information;
two second coils held by the holding unit, for moving the holding unit so that a focal point of the light beam collected by the light-collecting unit follows a track formed in the recording medium;
two third coils held by the holding unit, for tilting the holding unit so as to tilt the light-collecting unit in accordance with a tilt of the recording medium;
a supporting unit for movably supporting the holding unit;
two magnets for allowing the first coil, the two second coils, and the two third coils to be driven; and
a base for supporting the supporting unit and the two magnets,
the two second coils and the two third coils being disposed so that among planes defined by the respective coils, a plane perpendicular to an axial direction of each of the coils is parallel to the reference plane defined on the holding unit at a predetermined reference distance or less.

Further, in the invention, it is preferable that the first coil is disposed so that among planes defined by the first coil, a plane perpendicular to a recording surface of the recording medium is parallel to the reference plane at a predetermined reference distance or less.

Further, in the invention, it is preferable that the two second coils and the two third coils are disposed at such positions as to be symmetrical to each other about a position obtained by projecting on the reference plane a center of gravity of the holding unit for holding the light-collecting unit, the first coil, the two second coils, and the two third coils.

Further, in the invention, it is preferable that among winding parts of the respective second coils, one winding parts of the respective second coils extending in a direction same as an optical axis direction of the light-collecting unit have outer circumferential surfaces parallel and close to each other.

Further, in the invention, it is preferable that among winding parts of the respective second coils, one winding parts of the respective second coils extending in a direction same as an optical axis direction of the light-collecting unit are disposed on a straight line in a direction same as an optical axis direction of the light-collecting unit.

Further, in the invention, it is preferable that among the magnets, a first magnet is disposed close to the first coil, among the magnets, a second magnet different from the first magnet is disposed close to the two second coils and the two third coils, and the first magnet is different from the second magnet in at least one of height, width, and thickness.

Further, in the invention, it is preferable that the supporting unit supports the holding unit at positions defined by intersection of the supporting unit and a plane at an intermediate position between the reference plane and a plane which is defined by the first coil and parallel to the reference plane at the predetermined reference distance or less.

Further, in the invention, it is preferable that the objective lens drive further comprises two second coils same as the two second coils and two third coils same as the two third coils, and two second coils among the four second coils and two third coils among the four third coils are disposed so as to be symmetrical to the other two second coils among the four second coils and the other two third coils among the four third coils relative to a plane including an optical axis of the light-collecting unit, the plane being perpendicular to a recording surface of the recording medium and orthogonal to axial lines of the second coils.

Further, in the invention, it is preferable that the objective lens drive further comprises two second coils same as the two second coils and two third coils same as the two third coils, and two second coils among the four second coils and two third coils among the four third coils are disposed so as to be symmetrical to the other two second coils among the four second coils and the other two third coils among the four third coils relative to an optical axis of the light-collecting unit.

Further, in the invention, it is preferable that the supporting unit supports the holding unit at positions defined by intersection of the supporting unit and a plane including the optical axis of the light-collecting unit, the plane being perpendicular to the recording surface of the recording medium and orthogonal to axial lines of the second coils.

The invention provides an optical pickup apparatus comprising:

the objective lens drive mentioned above;

a light source for emitting a light beam;

an optical component for converting the light beam emitted by the lights source into a collimated light beam; and a reflecting unit for reflecting toward the light-collecting unit the light beam having passed through the optical component.

According to the invention, the light beam is collected by light-collecting unit; the light-collecting unit is held by the holding unit having the reference plane defined thereon; the first coil held by the holding unit moves the holding unit so that the light beam collected by the light-collecting unit focus on the recording medium for recording information thereon; and the two second coils held by the holding unit move the holding unit so that the focal point of the light beam collected by the light-collecting unit follows the track formed in the recording medium.

And the holding unit is tilted by the two third coils held by the holding unit so as to tilt the light-collecting unit in accordance with a tilt of the recording medium; the holding unit is movably supported by the supporting unit; the two magnets allow the first coil, two second coils, and two third coils to be driven; and the base supports the supporting unit and the two magnets. Furthermore, the two second coils and the two third coils are disposed so that among the planes defined by the respective coils, a plane perpendicular to an axial direction of each coil is parallel to the reference plane at a predetermined reference distance or less. Now the planes defined by the coil refers to planes which define a virtual circular member based on the coil with a virtual inner circumferential face and a virtual outer circumferential face that extend in parallel with the axial line of the coil as well as virtual end faces that are disposed on both axial ends of the coil and perpendicular to the axial line of the coil.

That is to say, the two second coils and the two third coils are arranged side by side in the direction perpendicular to the axial direction thereof, therefore allowing for downsizing in the axial direction. Accordingly, the objective lens drive can be reduced in size, thus allowing for downsizing of the objective lens drive.

According to the invention, the light-collecting unit is driven by the objective lens drive; the light beam is emitted by the light source; the light beam emitted by the lights source is converted into the collimated light beam; and the light beam which has passed through the optical component, is reflected toward the light-collecting unit. Accordingly, since the objective lens drive mentioned above is used, the objective lens drive can be reduced in size, thus allowing for downsizing of the optical pickup apparatus.

BRIEF DESCRIPTION OF THE DRAWINGS

Other and further objects, features, and advantages of the invention will be more explicit from the following detailed description taken with reference to the drawings wherein:

FIGS. 4A and 4B are views each showing a schematic configuration of an optical pickup apparatus according to one embodiment of the invention.

DETAILED DESCRIPTION

Figure 1A:
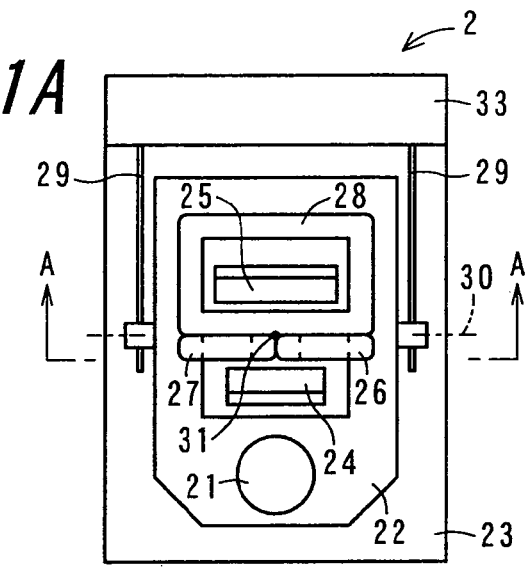
FIGS. 1A to 1C are views each showing a schematic configuration of an actuator according to a first embodiment of the invention.

Now referring to the drawings, preferred embodiments of the invention are described below.

Figure 1B:
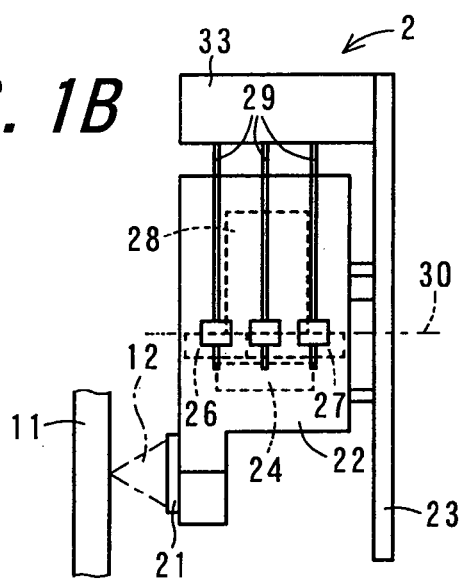
Figure 1C:
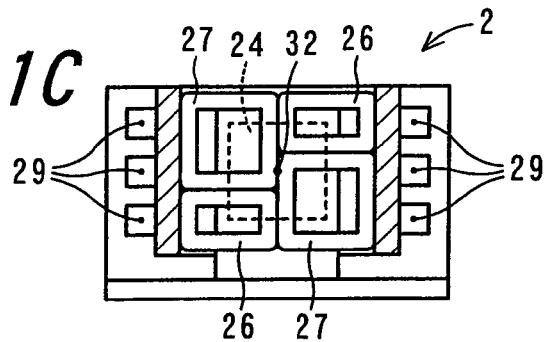

FIGS. 1A to 1C are views each showing a schematic configuration of an actuator 2 according to a first embodiment of the invention. FIG. 1A is a top view, FIG. 1B a side view, and FIG. 1C a sectional view taken along cross-section line A-A shown in FIG. 1A.

The actuator 2 serving as an objective lens drive includes an objective lens 21, a lens holder 22, a base plate 23, magnets 24 and 25, tilt coils 26, tracking coils 27, a focus coil 28, elastic support members 29, and a support member 33. The objective lens 21 serving as a light-collecting unit collects a light beam onto a recording surface of a recording medium for recording information thereon, for example, an optical disk 11, and converts a light beam reflected by the recording surface into a collimated light beam. The objective lens 21 is disposed on an end of the lens holder 22.

The lens holder 22 serving as a holding unit is made of high-strength engineering plastic with an insulation property and high-specific strength, that is, high strength and low specific gravity. A specific example of the high-strength engineering plastic includes polyphenylene sulfide (abbreviated as PPS) and liquid crystal polymer (abbreviated as LCP). It is therefore possible to read signals stably in accordance with the movement of the optical disk 11. The lens holder 22 is supported by six elastic support members 29 and holds the objective lens 21, two tilt coils 26, two tracking coils 27, and one focus coil 28. In addition, the lens holder 22 is formed in a substantially rectangular parallelepiped shape. The lens holder 22 has a reference plane 30 defined thereon. The reference plane 30 is a virtual plane perpendicular to a longitudinal direction of the lens holder 22.

The base plate 23 needs to be strong enough to reaction force, i.e., electromagnetic force, applied to the magnet, and therefore is formed of, for example, a plate material made of iron alloy, etc. The base plate 23 supports the support member 33 and the magnets 24, 25. The support member 33 is fixed to the base plate 23 and supports the six elastic support members 29. In order to provide the respective elastic support members 29 independently with conductive properties and to attenuate resonance vibration of the elastic support members 29 with the aid of a damping material injected to the support member 33, the support member 33 is required to satisfy the same conditions as those which the lens holder 22 satisfies, except a weight condition. For example, the support member 33 is made of engineering plastic as in the case of the lens holder 22. The base plate 23 and the support member 33 constitute a base.

The magnet 24 is a magnet for allowing the tilt coils 26 and the tracking coils 27 to be driven, and is fixed to the base plate 23. The magnet 25 is a magnet for allowing the focus coil 28 to be driven, and is fixed to the base plate 23. The magnets 24 and 25 are disposed so as to sandwich parts of windings of the tilt coils 26, the tracking coils 27, and the focus coil 28. The magnets 24 and 25 are composed of a magnet.

The tilt coil 26 serving as the third coil tilts the lens holder 22 so as to tilt the objective lens 21 in accordance with a tilt of the optical lens 11. To be specific, in a cross section shown in the sectional view of FIG. 1C, a position denoted by a reference numeral 32 is a center of rotation around which the objective lens 21 is driven. Hereinafter, a direction of the rotation will be referred to as a tilt direction.

The tracking coil 27 serving as the second coil moves the lens holder 22 so that the focus of the light beam 12 collected by the objective lens 21 follows the track formed in the optical disk 11. To be specific, the objective lens 21 moves along the straight line formed by intersection of a plane perpendicular to the optical axis of the objective lens 21 and a plane perpendicular to the axial line of the tracking coil 27. That is to say, the objective lens 21 moves in a direction which is parallel to the recording surface of the optical disk 11 and orthogonal to an extending direction of each of the elastic support members 29. Hereinafter, this direction will be referred to as a tracking direction.

The focus coil 28 serving as the first coil moves the lens holder 22 so that the light beam 12 collected by the objective lens 21 focus on the optical disk 11. To be specific, the objective lens 21 moves close to or away from the recording surface of the optical disk 11. Hereinafter, this direction will be referred to as a focus direction.

In respect of a material, the tilt coil 26, the tracking coil 27, and the focus coil 28 are each formed by layering an insulating film on a surface of a conductive material such as copper alloy or aluminum alloy. In respective of a shape, the tilt coil 26, the tracking coil 27, and the focus coil 28 each have a winding shape of square ring or square window.

In FIG. 1C, six elastic support members 29 each serving as the supporting unit are arranged in parallel to the recording surface of the optical disk 11 and composed of two arranged laterally by three arranged vertically relative to the lens holder 22. The elastic members are each formed of a thin metal plate or wires, for example. One end of each elastic support member 29 is fixed to the support member 33 with the aid of the damping material. The damping material is injected to recesses formed in an insertion surface of the support member 33 for the elastic support members 29, and functions to attenuate resonance vibration of the displaceable part, that is, the lens holder 22, caused by the elastic support members 29.

The tilt coil 26, the tracking coil 27, and the focus coil 28 each have its both ends electrically connected to each other through the elastic support member 29. Current flowing through the respective coils and electromagnetic force generated by magnetic force of the magnets 24 and 25 will act as drive force for the respective coils. Since the magnets 24 and 25 are fixed to the base plate 23 so as not to move, the displaceable part, that is, the lens holder 22, will move.

That is to say, the current flow to the tilt coil 26, the tracking coil 27, and the focus coil 28 disposed adjacent to the magnets 24 and 25 will cause curve deformation in the respective elastic support members 29, with the result that the lens holder 22 supported around one ends of the respective elastic support members 29 having the other ends fixed is displaced in the tilt direction, tracking direction, or focus direction relative to the base plate 23.

At least one axial end faces of the respective two tilt coils 26 and at least one axial end faces of the respective two tracking coils 27 are made substantially flush with each other. In other words, out of planes which are defined by the respective coils, a plane perpendicular to the axial direction is parallel to a reference plane 30 at a predetermined reference distance or less, for example, 0.1 mm or less. Furthermore, relative to the thickest one of the four coils along the axial direction, the other coils desirably have such thicknesses that no part thereof sticks out in their thickness directions from the thickest coil.

It is therefore possible to downsize each of the elastic support members 29 in its extending direction, allowing for a decrease in size of the actuator 2.

As above, the light beam is collected by the objective lens 21; the objective lens 21 is held by the lens holder 22; the lens holder 22 is moved by the focus coil 28 held by the lens holder 22 so that the light beam 12 collected by the objective lens 21 focus on the optical disk 11 for recording information thereon; and the lens holder 22 is moved by the two tracking coils 27 held by the lens holder 22 so that the focal point of the light beam 12 collected by the objective lens 21 follows the track formed in the optical disk 11.

And the lens holder 22 is tilted by the two tilt coils 26 held by the lens holder 22 so that the objective lens 21 is tilted in accordance with a tilt of the optical disk 11; the lens holder 22 is movably supported by the elastic support members 29; the focus coil 28, two tracking coils 27, and two tilt coils 26 are allowed to be driven by the two magnets 24 and 25; and the elastic support members 29 and the two magnets 24 and 25 are supported by the base plate 23 and the support member 33. Furthermore, the two tracking coils 27 and the two tilt coils 26 are disposed so that among the planes defined by the respective coils, a plane perpendicular to an axial direction of each coil is parallel to the reference plane 30 at a predetermined reference distance or less.

That is to say, the two tracking coils 27 and the two tilt coils 26 are arranged side by side in the direction perpendicular to the axial direction thereof, therefore allowing for downsizing in the axial direction. Accordingly, the actuator 2 can be reduced in size, thus allowing for downsizing of the actuator 2.

At least one axial end faces of the respective two tilt coils 26 and at least one axial end faces of the respective two tracking coils 27 are made substantially flush with each other. A plane on which the axial end faces reside may be hereinafter referred to as the substantially same plane. The substantially same plane is closely parallel to or substantially flush with a plane defined by the focus coil 28 substantially perpendicular to the rotation direction of the optical disk 11. In other words, out of the planes defined by the focus coil 28, a plane perpendicular to the recording surface of the optical disk 11 is parallel to the reference plane 30 at a predetermined reference distance or less relative to the two tilt coils 26 and the two tracking coils 27.

Accordingly, the focus coil 28 is disposed in the direction orthogonal to the tracking direction relative to the tilt coils 26 and the tracking coils 27, therefore allowing for downsizing in the tracking direction.

As described above, the focus coil 28 is disposed so that, among the planes defined by the focus coil 28, a plane perpendicular to the recording surface of the optical disk 11 is parallel to the reference plane 30 at the predetermined reference distance or less. That is to say, the focus coil 28 is disposed in the direction orthogonal to the tracking direction relative to the tilt coils 26 and the tracking coils 27, therefore allowing for downsizing in the tracking direction.

The two tilt coils 26 and the two tracking coils 27 are disposed so as to be symmetrical to each other about the position 32 which is obtained by projecting a center of gravity of the lens holder 22 on the substantially same plane on which these coils are disposed. The center of gravity of the lens holder 22 specifically represents the center of gravity of the lens holder 22 which holds the objective lens 21, the two tilt coils 26, the two tracking coils 27, and the one focus coil 28.

In other words, the two tilt coils 26 and the two tracking coils 27 are disposed so as to be symmetrical to the position 32 which is obtained by projecting the center of gravity of the lens holder 22 on the reference plane 30. Accordingly, the two tilt coils 26 are disposed away from the center of gravity, thus allowing for compensation in the tilt direction with small drive force and allowing for power saving.

As described above, the two tracking coils 27 and the two tilt coils 26 are arranged at positions symmetrical to each other about the position 32 that is obtained by projecting on the reference plane 30 the center of gravity of the lens holder 22 which holds the objective lens 21, the focus coil 28, the two tracking coils 27, and the two tilt coils 26. Accordingly, the two tilt coils 26 are disposed away from the center of gravity, thus allowing for compensation in the tilt direction with small drive force and allowing for power saving.

The tracking coils 27 have winding parts which are opposed to each other and extend in substantially the same direction of the light beam 12 passing through the objective lens 21. Such winding parts are positioned close to each other and parallel to a straight line which is obtained by transferring the light beam 12 onto the substantially same plane, thus being disposed on the substantially same plane. In other words, among the winding parts of the respective tracking coils 27, one winding parts of the respective tracking coils 27 extending in the same direction as that of the optical axis of the objective lens 21 have outer circumferential surfaces parallel and close to each other. Accordingly, the objective lens 21 can be less tilted during the movement in the tracking direction.

As described above, among the winding parts of the tracking coils 27, one winding parts of the respective tracking coils 27 extending in the same direction as that of the optical axis of the objective lens 21 have outer circumferential surfaces parallel and close to each other, with the result that the objective lens 21 can be less tilted during the movement in the tracking direction.

The electromagnetic force for driving each coil is determined by multiplying "flux density of the magnet", "current flowing through the coil", and "the length of the coil in the magnetic field". According to the electromagnetic force required for each coil, "flux density of the magnet", "current flowing through the coil", and "the length of the coil in the magnetic field" are set at minimum values. Note that "flux density of the magnet" depends on a material, thickness, or the like factor while "the length of the coil in the magnetic field" depends on a dimension, that is, height and width, of the magnet, the winding number of the coil, or the like factor.

Although the electromagnetic force may be regulated according to a method in which the winding number of the coil is adjusted, such method has problems of causing an increase in current consumption due to a decrease in resistance and of requiring alignment of center of gravity when the displaceable part becomes off-balance due to changes in weight. Furthermore, it is difficult to change the material of the magnet to adjust the flux density and therefore, the electromagnetic force is generally regulated by adjusting the dimension, that is, height, width, and thickness, of the magnet.

The magnet 24 and the magnet 25 are different from each other in at least one of height, width, and thickness. Accordingly, the magnet 24 and the magnet 25 are not required to be completely the same in size and therefore allowed to have the minimum magnet size required to apply the drive force respectively to the focus coil 28, the tracking coils 27, and the tilt coils 26, thus enabling size reduction.

As described above, among the magnets 24 and 25, the magnet 25 is disposed close to the focus coil 28 while the magnet 24 different from the magnet 25 is close to the two tracking coils 27 and the two tilt coils 26, and since the magnet 24 and the magnet 25 are different from each other in at least one of height, width, and thickness, the magnet 24 and the magnet 25 may have the minimum magnet size required to apply the drive force respectively to the focus coil 28, the tracking coils 27, and the tilt coils 26, thus enabling size reduction.

The elastic support members 29 support the lens holder 22 in the displaceable manner at positions which are projected from an intermediate position 31 disposed between the same substantially plane on which the tilt coils 26 and the tracking coils 27 are disposed, and the plane which is closely parallel to or substantially flush with the plane of the focus coil 28 substantially perpendicular to the rotation direction of the optical disk 11.

In other words, the elastic support members 29 support the lens holder 22 at the positions defined by intersection of the elastic support members 29 and the plane which is disposed at the intermediate position between the reference plane 30 and one plane of the focus coil 28 parallel to the reference plane 30 at a predetermined reference distance or less. Accordingly, the moment generated during the movement in the tracking direction can be cancelled out and thereby reduced.

As described above, the lens holder 22 is supported by the elastic support members 29 at the positions defined by intersection of the elastic support members 29 and the plane which is disposed at the intermediate position between the reference plane 30 and one plane of the focus coil 28 parallel to the reference plane 30 at a predetermined reference distance or less, with the result that the moment generated during the movement in the tracking direction can be cancelled out and thereby reduced.

Figure 2A:
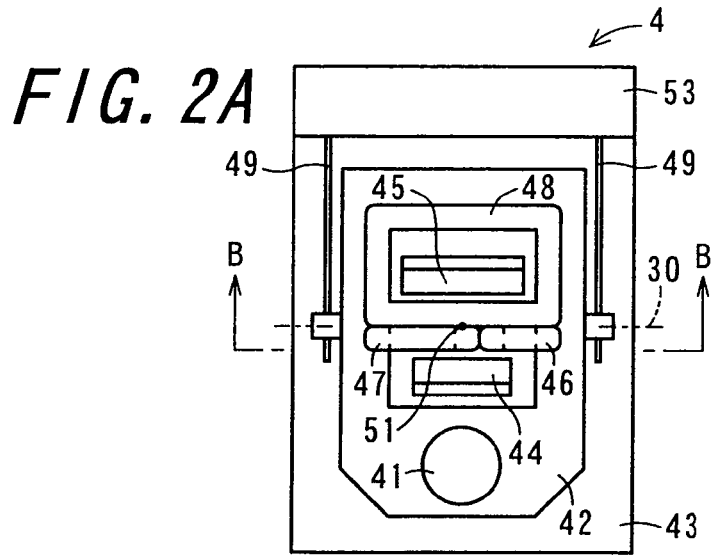
FIGS. 2A to 2C are views each showing a schematic configuration of an actuator according to a second embodiment of the invention.
Figure 2B:
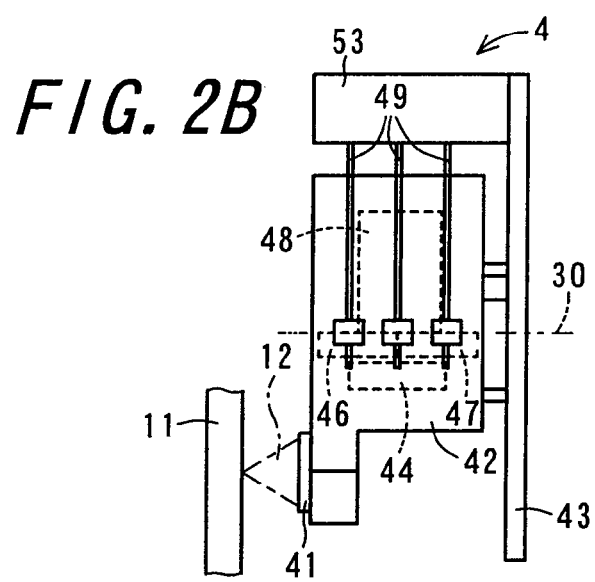
Figure 2C:
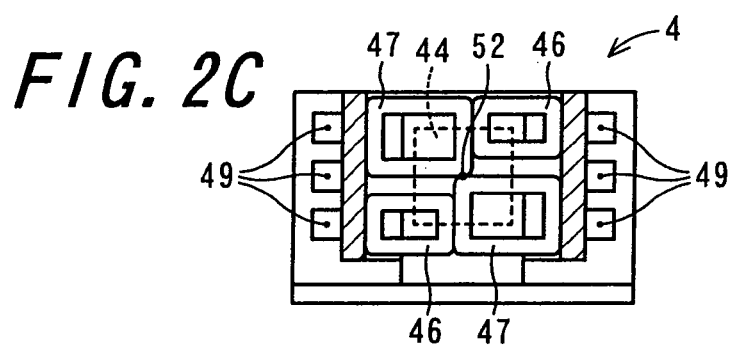

FIGS. 2A to 2C are views each showing a schematic configuration of an actuator 4 according to the second embodiment of the invention. FIG. 2A is a top view, FIG. 2B a side view, and FIG. 2C a sectional view taken along cross-section line B-B shown in FIG. 2A.

The actuator 4 serving as an objective lens drive includes an objective lens 41, a lens holder 42, a base plate 43, magnets 44 and 45, tilt coils 46, tracking coils 47, a focus coil 48, elastic support members 49, and a support member 53.

The objective lens 41, the lens holder 42, the base plate 43, the magnets 44 and 45, the focus coil 48, the elastic support members 49, and the support member 53 are the same as the objective lens 21, the lens holder 22, the base plate 23, the magnets 24 and 25, the focus coil 28, the elastic support members 29, and the support member 33, respectively, shown in FIGS. 1A to 1C, and therefore will not be explained to avoid overlapping.

The tilt coils 46 and the tracking coils 47 are the same as the tilt coils 26 and the tracking coils 27, respectively, shown in FIGS. 1A to 1C, except a positional relation between the tilt coils 46 and the tracking coils 47, and therefore overlapping explanations will be omitted.

The tracking coils 47 have winding parts which are opposed to each other and extend in substantially the same direction of the light beam 12 passing through the objective lens 41. Such winding parts are disposed on substantially the same line on a straight line which is obtained by projecting the light beam 12 the substantially same plane. In other words, among the winding parts of the respective tracking coils 47, one winding parts of the respective tracking coils 47 extending in the same direction as that of the optical axis of the objective lens 41 are disposed on a straight line in the same direction as that of the optical axis of the objective lens 41.

That is to say, the tilt coils 26 and the tracking coils 27 shown in FIG. 1A to FIG. 1C are disposed so that among the winding parts of the respective tracking coils 27, one winding parts of the respective tracking coils 27 extending in the same direction as that of the optical axis of the objective lens 21 have outer circumferential surfaces parallel and close to each other, while the tilt coils 46 and the tracking coils 47 are disposed so that among the winding parts of the respective tracking coils 47, one winding parts of the respective tracking coils 47 extending in the same direction as that of the optical axis of the objective lens 41 are disposed on the straight line in the same direction as that of the optical axis of the objective lens 41.

Accordingly, the objective lens 41 can be less tilted during the movement in the tracking direction.

As described above, among the winding parts of the respective tracking coils 47, one winding parts of the respective tracking coils 47 extending in the same direction as that of the optical axis of the objective lens 41 are disposed on the straight line in the same direction as that of the optical axis of the objective lens 41, with the result that the objective lens 41 can be less tilted during the movement in the tracking direction.

The other effects of the actuator 4 are the same as the effects of the actuator 2.

Figure 3A:
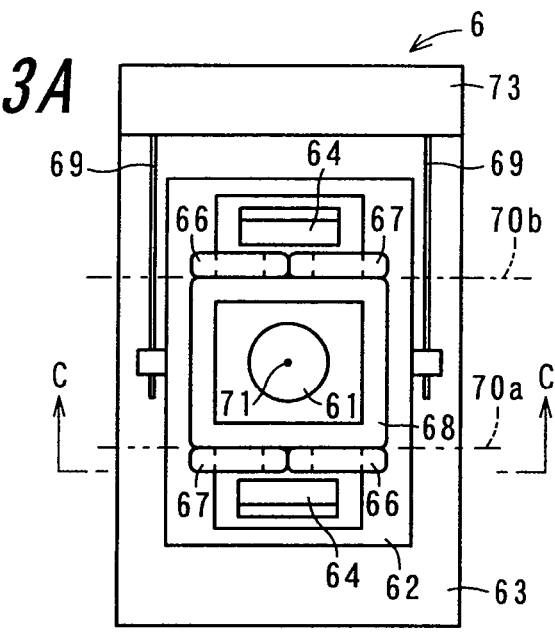
FIGS. 3A to 3C are views each showing a schematic configuration of an actuator according to a third embodiment of the invention.
Figure 3B:
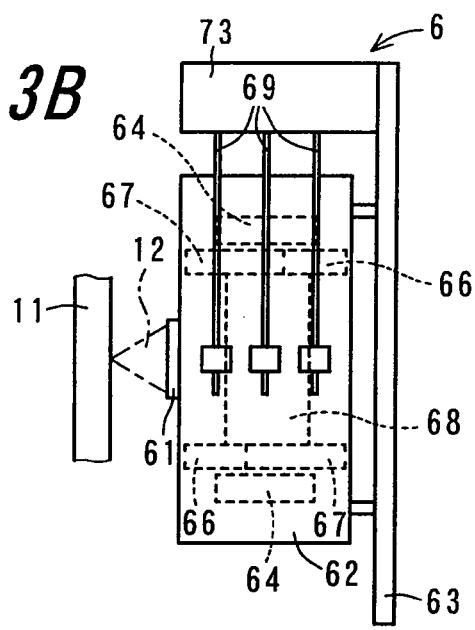
Figure 3C:
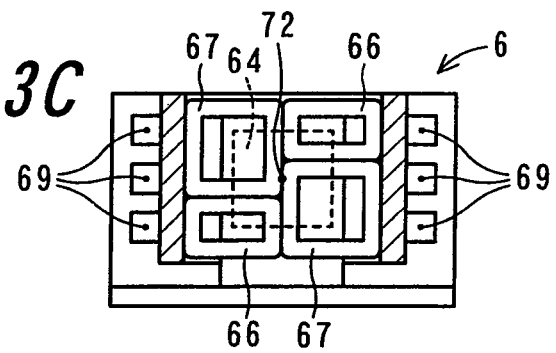

FIGS. 3A to 3C are views each showing a schematic configuration of an actuator 6 according to the third embodiment of the invention. FIG. 3A is a top view, FIG. 3B a side view, and FIG. 3C a sectional view taken along cross-section line C-C shown in FIG. 3A.

The actuator 6 serving as an objective lens drive includes an objective lens 61, a lens holder 62, a base plate 63, magnets 64, tilt coils 66, tracking coils 67, a focus coil 68, elastic support members 69, and a support member 73.

The objective lens 61, the lens holder 62, the base plate 63, the magnets 64, the tilt coils 66, the tracking coils 67, the focus coil 68, the elastic support members 69, and the support member 53 are the same as the objective lens 21, the lens holder 22, the base plate 23, the magnet 24, the tilt coils 26, the tracking coils 27, the focus coil 28, the elastic support members 29, and the support member 33, respectively, shown in FIGS. 1A to 1C, and therefore will not be explained to avoid overlapping. Note that, the lens holder 62 has two reference planes 70a and 70b defined thereon. The two reference planes 70a and 70b are virtual planes which are perpendicular to a longitudinal direction of the lens holder 62 and disposed apart from each other in the longitudinal direction of the lens holder 62.

The objective lens 21 shown in FIGS. 1A to 1C is disposed on the end of the lens holder 22, while the objective lens 61 is disposed at a center part of the lens holder 62, that is, at a position in the focus direction of the focus coil 68.

As to the numbers of components disposed, there are two magnets 64, four tilt coils 66, and four tracking coils 67. That is to say, there are two sets of the one magnet 24, two tilt coils 26, and two tracking coils 27 shown in FIGS. 1A to 1C. The two magnets 64 correspond to the magnet 24 and the magnet 25 shown in FIGS. 1A to 1C.

Out of the two sets, the first set is disposed at the same positions relative to the focus coil 68 as the magnet 24, the tilt coils 26, and the tracking coils 27 shown in FIGS. 1A to 1C, while the second set different from the first set is disposed at positions symmetrical to the first set relative to a plane in the tracking direction, which plane includes an optical axis of the objective lens 61 and is perpendicular to the recording surface of the optical disk 11. In the case where large drive force in the tracking direction is required, the actuator having such a configuration just described need not be made larger in its thickness direction to adapt to the large drive force.

As described above, the two tracking coils 67 as well as the same two tracking coils 67 and the two tilt coils 66 as well as the same two tilt coils 66 are included, and relative to the plane which includes the optical axis of the objective lens 61 and is perpendicular to the recording surface of the optical disk 11 and which is orthogonal to the axial line of the second coil, the two tracking coils 67 out of the four tracking coils 67 and the two tilt coils 66 out of the four tilt coils 66 are disposed so as to be symmetrical respectively to the other two tracking coils 67 out of the four tracking coils 67 and the other two tilt coils 66 out of the four tilt coils 66. In the case where large drive force in the tracking direction is required, the actuator having such a configuration just described need not be made larger in its thickness direction to adapt to the large drive force.

Alternatively, the second set is disposed at the position symmetrical to the first set. In the case where large drive force in the tracking direction is required, the actuator having such a configuration just described need not be made larger in its thickness direction to adapt to the large drive force.

As described above, the two tracking coils 67 as well as the same two tracking coils 67 and the two tilt coils 66 as well as the same two tilt coils 66 are included, and relative to the optical axis of the objective lens 61, the two tracking coils 67 out of the four tracking coils 67 and the two tilt coils 66 out of the four tilt coils 66 are disposed so as to be symmetrical respectively to the other two tracking coils 67 out of the four tracking coils 67 and the other two tilt coils 66 out of the four tilt coils 66. In the case where large drive force in the tracking direction is required, the actuator having such a configuration just described need not be made larger in its thickness direction to adapt to the large drive force.

The two tilt coils 66 and the two tracking coils 67 are disposed so as to be symmetrical to each other about the position 72 which is obtained by projecting a center of gravity of the lens holder 62 on the substantially same plane on which these coils are disposed. The center of gravity of the lens holder 62 specifically represents the center of gravity of the lens holder 62 which holds the objective lens 71, the two tilt coils 66, the two tracking coils 67, and the one focus coil 68.

In other words, the two tilt coils 66 and the two tracking coils 67 are disposed so as to be symmetrical to each other about the position 72 which is obtained by projecting the center of gravity of the lens holder 62 on the reference plane 70a, 70b. Accordingly, the two tilt coils 66 are disposed away from the center of gravity, thus allowing for compensation in the tilt direction with small drive force and allowing for power saving.

The elastic support members 69 support the lens holder 62 in the displaceable manner at positions where a position 71 defined by intersection of a plane which is substantially perpendicular to the rotation direction of the optical disk 11 and the optical axis of the objective lens 61 is projected on side faces of the lens holder 62. In other words, the elastic support members 69 support the lens holder 62 at the positions defined by intersection of the elastic support member 69 and the plane which includes the optical axis of the objective lens 61 and is perpendicular to the recording surface of the optical disk 11 and which extends in the tracking direction. Accordingly, the moment generated during the movement in the tracking direction can be cancelled out and thereby reduced.

As described above, the lens holder 62 is supported by the elastic support members 69 at the positions defined by intersection of the elastic support members 69 and the plane which includes the optical axis of the objective lens 61 and is perpendicular to the recording surface of the optical disk 11 and which is orthogonal to the axial line of the tracking coil 67, with the result that the moment generated during the movement in the tracking direction can be cancelled out and thereby reduced.

The other parts of the actuator 6 which overlap with those of the actuator 2, will not be explained. The other effects of the actuator 6 are the same as those of the actuator 2.

Figure 4B:
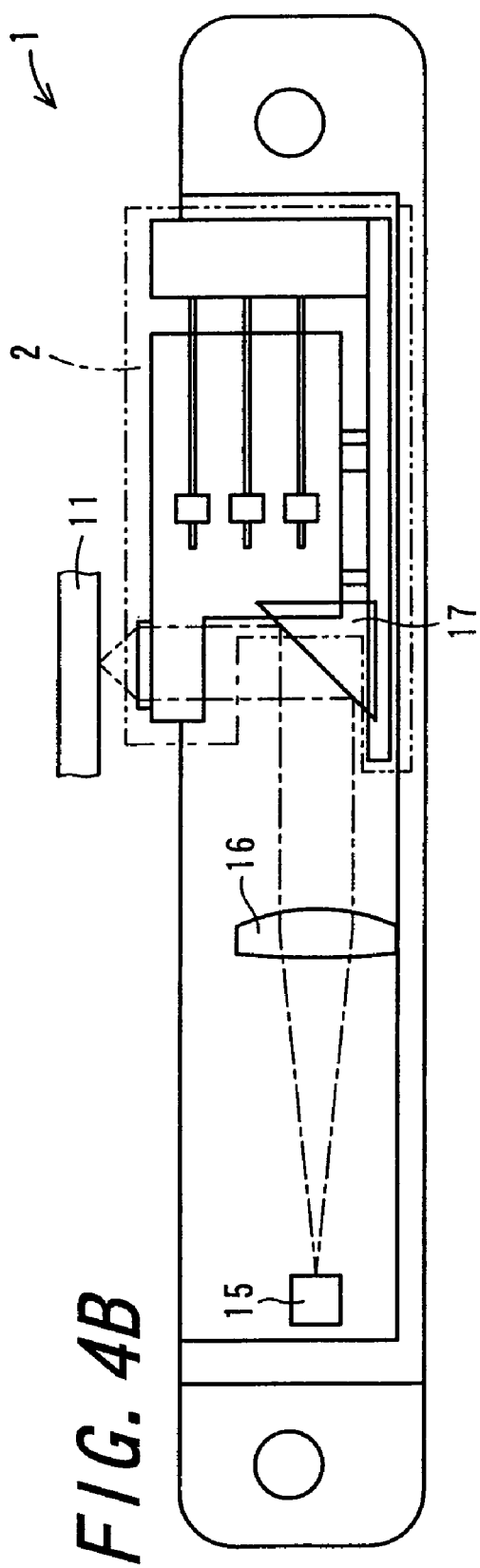
Figure 5A:
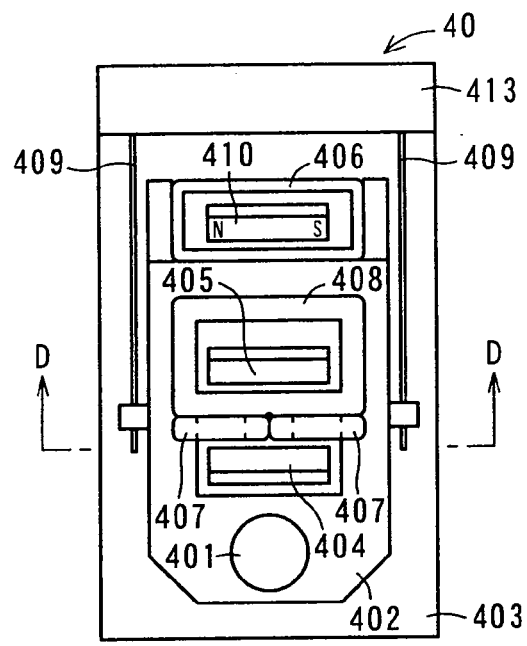
FIGS. 5A to 5C are views each showing an actuator according to the first related art.
Figure 5B:
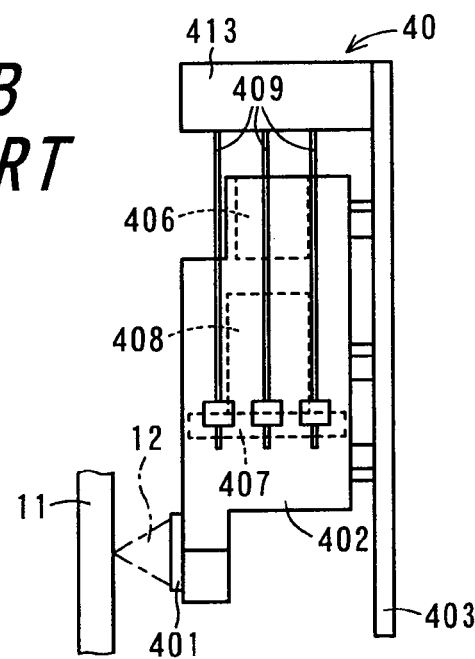
Figure 5C:
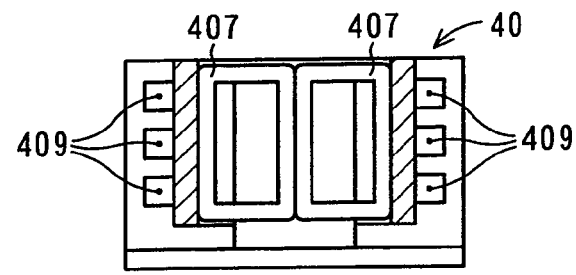

FIGS. 4A and 4B are views each showing a schematic configuration of an optical pickup apparatus 1 according to one embodiment of the invention. FIG. 4A is a top view and FIG. 4B is a side view. The optical pickup apparatus 1 includes an actuator 2, a laser light source 15, a collimation lens 16, and a rising prism 17.

The actuator 2 is the same one as that shown in FIGS. 1A to 1C and may be replaced by the actuator 4 shown in FIGS. 2A to 2C or the actuator 6 shown in FIGS. 3A to 3C. The laser light source 15 serving as a light source emits a light beam. The collimation lens 16 which is an optical component converts the light beam emitted from the laser light source 15 into a collimated light beam. The rising prism 17 serving as a reflecting unit reflects toward the objective lens 21 the collimated light beam which has passed through the collimation lens.

As described above, the objective lens 21 is driven by the actuator 2; the light beam is emitted by the laser light source 15; the light beam emitted by the laser light source 15 are converted by the collimation lens 16 into the collimated light beam; and the light beam which has passed through the collimation lens 16, are reflected by the rising prism 21 toward the objective lens 21. As a result, the optical pickup apparatus 1 can be downsized with the actuator 2 which can be reduced in size.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An objective lens drive comprising:
   a light-collecting unit for collecting a light beam;
   a holding unit having a reference plane defined thereon so as to be perpendicular to a recording medium for recording information, for holding the light-collecting unit;
   a first coil held by the holding unit, for moving the holding unit so that the light beam collected by the light-collecting unit is focused on the recording medium, the first coil being wound around an axis extending in a first direction perpendicular to the recording medium;
   two second coils held by the holding unit, for moving the holding unit so that a focal point of the light beam collected by the light-collecting unit follows a track formed in the recording medium, each of the two second coils being wound around an axis extending in a second direction parallel to the recording medium and perpendicular to the reference plane defined on the holding unit;
   two third coils held by the holding unit, for tilting the holding unit so as to tilt the light-collecting unit in accordance with a tilt of the recording medium, each of the two third coils being wound around an axis extending in said second direction;
   a supporting unit for movably supporting the holding unit;
   two magnets for allowing the first coil, the two second coils, and the two third coils to be driven; and
   a base for supporting the supporting unit and the two magnets,
   wherein the two second coils are arranged so as to be rotationally symmetrical to each other around an axis of symmetry extending in the second direction, but are not plane symmetrical to each other, the two third coils are arranged so as to be rotationally symmetrical to each other around said axis of symmetry, but are not plane symmetrical to each other, and the two second coils and the two third coils are disposed so that among planes defined by a wound wire of the respective coils, a plane perpendicular to said axis of symmetry is parallel to the reference plane defined on the holding unit at a predetermined reference distance or less.

2. The objective lens drive of claim 1, wherein the first coil is disposed so that among planes defined by a wound wire of the first coil, a plane perpendicular to a recording surface of the recording medium is parallel to the reference plane at a predetermined reference distance or less.

3. The objective lens drive of claim 2, wherein said axis of symmetry passes through a position obtained by projecting on the reference plane a center of gravity of the holding unit for holding the light-collecting unit, the first coil, the two second coils, and the two third coils.

4. The objective lens drive of claim 2, wherein the supporting unit supports the holding unit at positions defined by intersection of the supporting unit and a plane at an intermediate position between the reference plane and a plane which is defined by the first coil and parallel to the reference plane at the predetermined reference distance or less.

5. The objective lens drive of claim 1, wherein, among winding parts of the respective second coils, one winding parts of the respective second coils extending in a direction same as an optical axis direction of the light-collecting unit have outer circumferential surfaces parallel and close to each other.

6. The objective lens drive of claim 1, wherein, among winding parts of the respective second coils, one winding parts of the respective second coils extending in a direction same as an optical axis direction of the light-collecting unit are disposed on a straight line in a direction same as an optical axis direction of the light-collecting unit.

7. The objective lens drive of claim 1, wherein, among the two magnets, a first magnet is disposed close to the first coil, among the magnets, a second magnet different from the first magnet is disposed close to the two second coils and the two third coils, and the first magnet is different from the second magnet in at least one of height, width, and thickness.

8. The objective lens drive of claim 1, further comprising additional two second coils similar to the two second coils and additional two third coils similar to the two third coils, wherein two second coils among the four second coils and two third coils among the four third coils are disposed so as to be rotationally symmetrical to the other two second coils among the four second coils and the other two third coils among the four third coils relative to a plane including an optical axis of the light-collecting unit, the plane being perpendicular to a recording surface of the recording medium and orthogonal to axial lines of the second coils.

9. The objective lens drive of claim 8, wherein the supporting unit supports the holding unit at positions defined by intersection of the supporting unit and a plane including the optical axis of the light-collecting unit, the plane being perpendicular to the recording surface of the recording medium and orthogonal to axial lines of the second coils.

10. The objective lens drive of claim 1, further comprising additional two second coils similar to the two second coils and additional two third coils similar to the two third coils, wherein two second coils among the four second coils and two third coils among the four third coils are disposed so as to be rotationally symmetrical to the other two second coils among the four second coils and the other two third coils among the four third coils relative to an optical axis of the light-collecting unit.

11. An optical pickup apparatus comprising:

the objective lens drive of claim 1;

a light source for emitting a light beam;

an optical component for converting the light beam emitted by the lights source into a collimated light beam; and a reflecting unit for reflecting toward the light-collecting unit the light beam having passed through the optical component.

* * * * *